United States Patent [19]
Herchenbach et al.

[11] Patent Number: 5,800,271
[45] Date of Patent: Sep. 1, 1998

[54] PROTECTIVE DEVICE FOR DRIVESHAFTS HAVING A REMOVABLE PROTECTIVE CONE

[75] Inventors: Paul Herchenbach, Ruppichteroth; Horst Kretschmer, Köln, both of Germany

[73] Assignee: GKN Walterscheid GmbH, Lohmar, Germany

[21] Appl. No.: 745,792

[22] Filed: Nov. 8, 1996

[30] Foreign Application Priority Data

Nov. 8, 1995 [DE] Germany ............... 195 41 511.6

[51] Int. Cl.⁶ ................................................. F16C 1/26
[52] U.S. Cl. ................................... 464/172; 464/175
[58] Field of Search ........................... 464/170, 172, 464/173, 175; 74/608, 609; 180/53.1; 280/240

[56] References Cited

U.S. PATENT DOCUMENTS

| | | |
|---|---|---|
| 3,884,536 | 5/1975 | Buthe .................... 464/170 X |
| 4,411,636 | 10/1983 | Buthe et al. ............ 464/172 |
| 4,435,166 | 3/1984 | Bondioli ................. 464/172 |
| 4,443,207 | 4/1984 | Buthe et al. ............ 464/172 |
| 4,496,334 | 1/1985 | Mikeska ................. 464/175 |
| 4,747,804 | 5/1988 | Benzi .................... 464/170 |
| 5,173,082 | 12/1992 | Bondioli ............... 464/172 X |

FOREIGN PATENT DOCUMENTS

| | | |
|---|---|---|
| 32 08 541 C1 | 6/1983 | Germany . |
| 62-45427 | 3/1987 | Japan . |
| 2-89819 | 3/1990 | Japan . |
| 2102526 | 2/1983 | United Kingdom . |

Primary Examiner—Eileen A. Dunn
Attorney, Agent, or Firm—Harness, Dickey & Pierce, P.L.C.

[57] ABSTRACT

A protective device for a driveshaft (1) has a connecting cap (9) and sliding ring (10) for connecting to a joint yoke (4) of a universal joint (2). The connecting cap (9) connects with a protective cone (1 2). The protective cone (12) includes a fixing portion (16) which fixes it on the connecting cap (9) by one or several resilient locking elements (22) which are connected to the sliding ring (10). The resilient locking elements (22) enable the protective cone (12) to be axially slid onto the connecting cap (9) without requiring any additional auxiliary means. However, the locking elements (22) can only be opened by deliberately actuating at least one locking element by a tool, to enable access to the joint (2) for maintenance purposes.

10 Claims, 5 Drawing Sheets

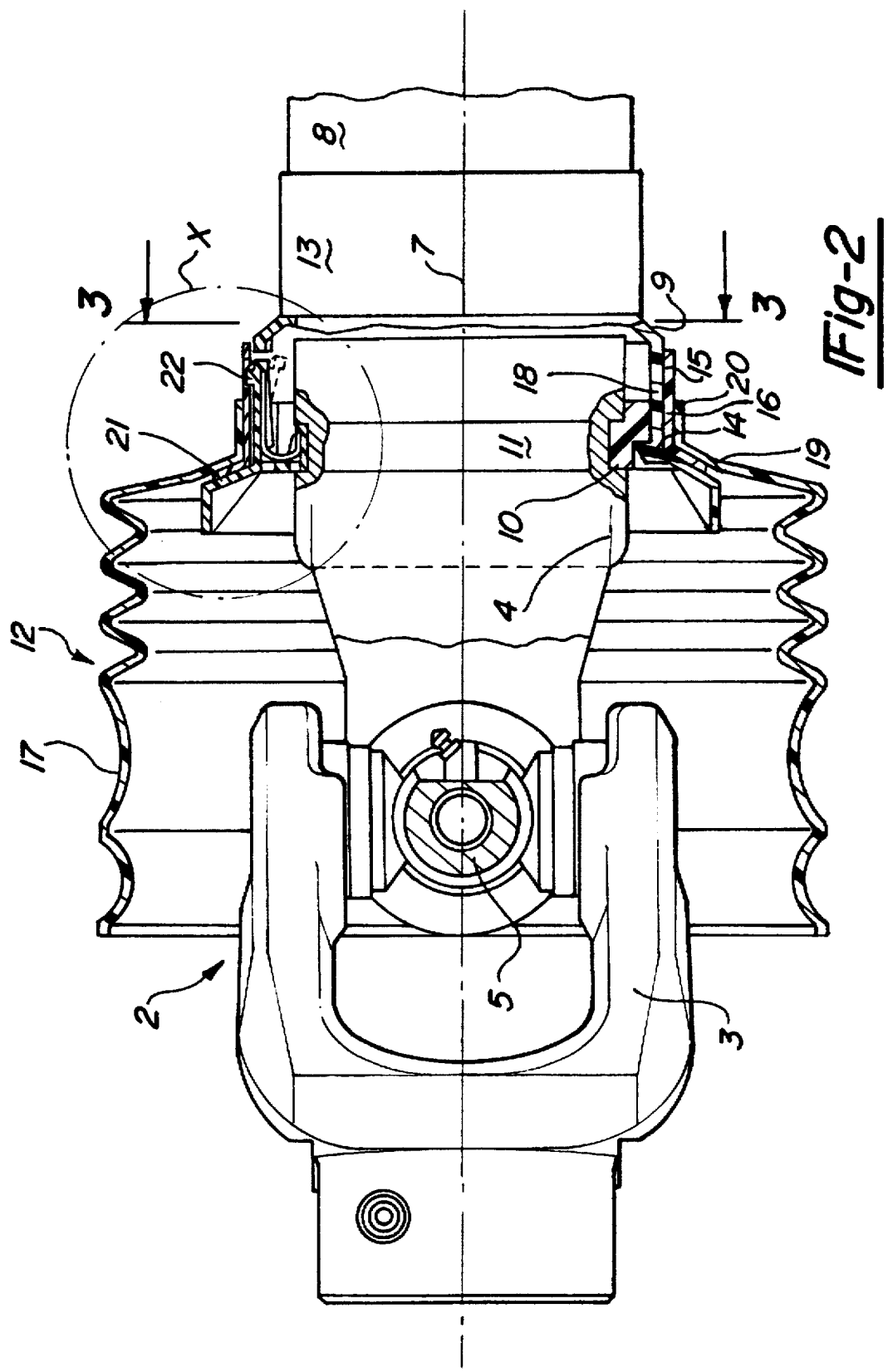

5,800,271

1

PROTECTIVE DEVICE FOR DRIVESHAFTS HAVING A REMOVABLE PROTECTIVE CONE

BACKGROUND OF THE INVENTION

The invention relates to a protective device for a driveshaft. The driveshaft includes two universal joints each having two joint yokes and a cross member articulatably connecting the two yokes. A connecting shaft with two sliding profiles inserted into one another is connected to the joint yokes of the two universal joints. Two protective tubes inserted into one another are arranged coaxially relative to the connecting shaft and its defined longitudinal axis. One connecting cap, one sliding ring and one protective cone are present per universal joint. The protective cone covers at least partially axially the associated universal joint. One protective cone, one protective tube and one sliding ring are connected to a connecting cap. The sliding ring is supported in a groove of a joint yoke of the associated universal joint. The protective cone is removably attached to the connecting cap even if the protective device is mounted to the driveshaft. The connecting cap includes a seat face which is used to slide on the protective cone via a fixing portion. A locking means secures the protective cone of the driveshaft. The cone is manually removable from the locking means.

A protective device is described in DE 32 08 541 C2, which corresponds to U.S. Pat. No. 4,496,334. The device provides an unfastenable connection between the protective cone and the connecting cap. The protective cone, in the region of its fixing portion, is provided with apertures which extend parallel to the longitudinal axis. The apertures lock with tongues associated with the connecting cap. After the locking tongues have passed through the apertures, the protective cone is turned by a certain angular distance relative to the connecting cap. As a result of the turning, the locking tongues axially secure the fixing portion of the protective cone in position. However, such a measure is not sufficient to achieve secure fixing conditions for all operating conditions. This is due to while the driveshaft rotates relative to the stationary protective device, vibrations occur which may cause the protective cone to be displaced relative to the locking tongues. This explains why additional measures, for instance using bolts, have been taken to secure the protective cone relative to the connecting cap, even in the direction of rotation.

SUMMARY OF THE INVENTION

It is an object of the invention to provide a protective device which ensures, when sliding the protective cone with its fixing portion onto the respective seat face of the connecting cap, that the protective cone is locked relative to the connecting cap both in axial and rotational directions to prevent the protective cone from being pulled off.

In accordance with the invention, the fixing portion of the protective cone and the connecting cap includes means for form-fittingly connecting the protective cone in rotational direction around the longitudinal axis. Thus, with reference to the longitudinal axis, the protective cone may be axially slid on and pulled off. The connecting cap and the fixing portion of the protective cone include stops to fix the protective cone in an axial direction along the longitudinal axis away from the connected protective tube.

Also, at least one resilient locking element is included. When sliding on the protective cone with its fixing portion onto the seat face of the connecting cap, the locking element is transferable into a withdrawn position. After the assembly position of the two relative to one another has been reached, the locking element secures the fixing portion in the direction of the protective tube. Here, a locking face engages the respective counter face of the fixing portion.

An advantage of the invention is that the fitting conditions of the protective cone and connecting cap can be selected such that, for the purpose of releasing the joint components, the protective cone can easily be pushed back after the resilient locking element has been actuated. Also, due to the form-fitting connection in the direction of rotation around the longitudinal axis after the protective cone has been slid on again, any vibrations which may occur does not have a loosening effect. It is necessary for the cone to be suitable to be pushed back to enable access to the joint components covered by the cone. The cone enables access to the cross member unit of the covered joint. Also, for lubrication purposes, the cone enables access to the bearing region for the protective device on the joint yoke of the covered joint. By sliding the protective cone with its fixing portion onto the respective seat face of the connecting cap, the resilient locking elements are automatically activated. Thus, when the connecting cap and fixing portion reach their assembly positions relative to one another, the resilient locking elements, under the force of a spring, automatically engage the fixing portion in the region of its counter face. Accordingly, this secures the protective cone relative to the connecting cap in the direction of the longitudinal axis. The non-rotating connection is achieved by the form-fitting conditions between the fixing portion and the connecting cap.

In a particularly advantageous embodiment, the resilient locking element is associated with a sliding ring and is produced integral therewith. As a rule, the sliding ring is of a high-quality plastic material which also has advantageous resilience characteristics. It is thus particularly advantageous if the locking element(s) is/are associated with the sliding ring and integrally produced by injection molding. However, the resilient locking element may also be associated with the connecting cap. In this case, the connecting cap has to be made of a suitable plastic material to ensure the required resilience.

In a preferred embodiment, the sliding ring is a polyamide. In order to ensure that, in the long run, creeping of the plastic material or any other signs of fatigue do not eliminate the resilient characteristics of the locking element, a metallic leaf spring, for supporting purposes, is associated with the locking element. The metallic leaf spring is preferably a stainless metal.

In a preferred embodiment, two resilient locking elements are circumferentially offset around the longitudinal axis by 180°. The protective cap includes associated apertures which enable the resilient locking element, with its locking face, to pass radially into the region of the counter face of the fixing portion.

An advantageous embodiment is achieved by arranging the counter face of the fixing portion in a radial aperture or in an axial cutout. In this way it is ensured that the locking element is protected and cannot, unintentionally, be transferred into an unlocked position because it does not project axially from the connecting cap. In the case of the two resilient locking elements circumferentially offset relative to one another by 180°, according to a preferred embodiment, the counter face for one locking element is arranged in an aperture of the fixing portion with the counter face for the other locking element arranged in an axial cutout. By arranging the counter face in a delimited aperture, this ensures that the locking element can only be opened by using a tool. The other locking element can be opened by applying pressure with the thumb of the operative's hand, for example.

This, substantially, results in a two-hand method of operation. One hand has to be used to open the one locking element and the other hand to use a tool to open the other locking element. What is achieved overall is that the protective cone can only be intentionally opened and thus removed from its assembly position on the connecting cap.

With the counter face arranged in such a way, according to a further embodiment, the locking face of the resilient locking element constitutes part of a lug pointing outwardly from the longitudinal axis. In order to transfer the locking element into the withdrawn position to slide the protective cone with its fixing portion onto the connecting cap into the assembly position, the lug may include a stop face which cooperates with the fixing portion. After the assembly position has been reached, the locking element automatically springs outwardly and, via its locking face, is positioned behind the counter face of the fixing portion. The lug may be provided with an indentation to enable the engagement of a tool, for example a screw driver, which is moved by hand into the indentation and subsequently tilted to rest against the wall of the aperture to achieve the release of the resilient locking element.

According to a further embodiment of the invention, the protective cone includes a plurality of parts and consists of a component constituting the fixing portion and of a protective element. It is possible to make the fixing portion itself relatively stiff. The protective element can be softer in the required direction, the axial direction. The fixing portion and the protective element are firmly connected to one another, for example in a form-fitting way. Also, the fixing portion and protective element are to jointly connect or release the connecting cap.

According to a further important characteristic, the form-fitting connection is achieved by wedges circumferentially distributed around the longitudinal axis and projecting radially outwardly beyond the seat face of the connecting cap. The fixing portion of the protective cone includes correspondingly formed and distributed grooves extending parallel to the longitudinal axis.

From the following detailed description, taken in conjunction with the drawings and subjoined claims, other objects and advantages of the present invention will become apparent to those skilled in the art.

BRIEF DESCRIPTION OF THE DRAWINGS

A preferred embodiment of the protective cap in accordance with the invention and the essential individual parts are diagrammatically illustrated in the drawing with reference to a driveshaft to drive an agricultural implement.

FIG. 2 is an enlarged longitudinal section view along line 2—2 of FIG. 3 of the protective device with the fixing portion for the lefthand joint illustrated in FIG. 1.

DETAILED DESCRIPTION OF THE DRAWINGS

Figure 1:
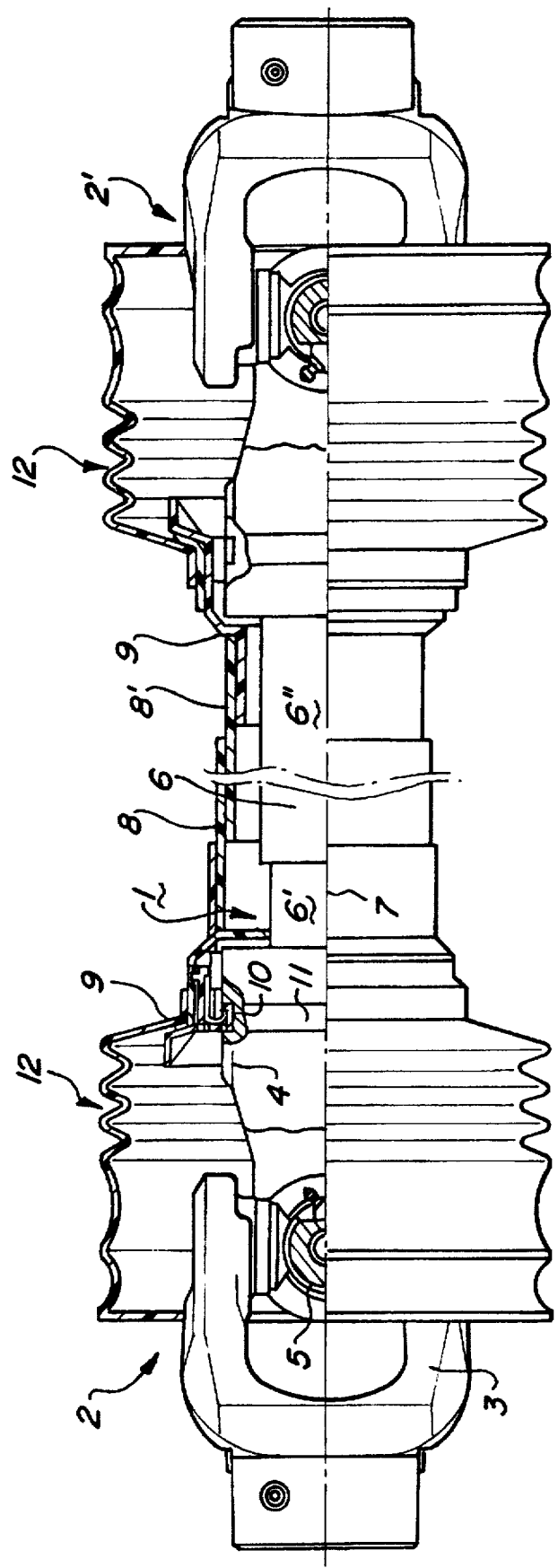
FIG. 1 is half a longitudinal section view through an agricultural driveshaft having a protective device in accordance with the invention.

FIG. 1 illustrates a driveshaft 1 with a protective device in accordance with the invention. The driveshaft 1 includes two universal joints 2, 2'. Each of the two universal joints 2, 2' has two joint yokes 3, 4 one of which is intended to be connected to a driving or driven member of a power take-off shaft of a tractor or to the driving journal of an agricultural implement. The two joint yokes 3, 4 are connected to one another by a cross member 5.

A connecting shaft 6 is arranged between the two universal joints 2, 2'. The shaft 6 includes two telescopic sliding profiles 6, 6' inserted into one another. The change in length takes place along the longitudinal axis 7.

The protective device includes two protective tubes 8, 8' which are arranged coaxially relative to the sliding shaft profiles 6', 6". The tubes 8, 8' are secured to the joint by means of a connecting cap 9 and sliding ring 10. The sliding ring engages a groove 11 in the associated joint yoke 4. Furthermore, each connecting cap 9 is associated with a protective cone 12 which at least partially covers the universal joint 2, 2' positioned underneath. During operation, the protective device is secured, for example, by a chain or any other suitable member so that only the driveshaft 1 rotates while the protective device remains stationary.

Figure 2A:
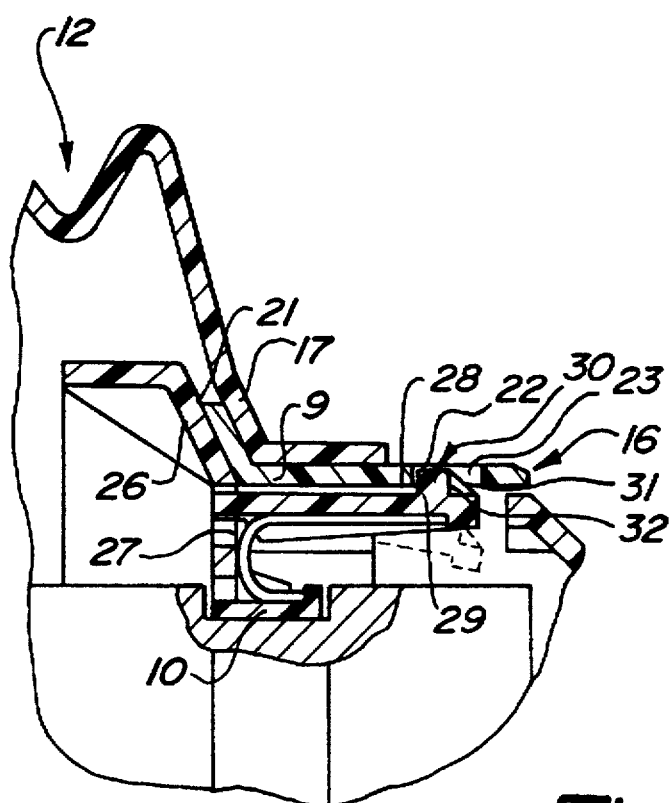
FIG. 2a is an enlarged detail view within circle X of FIG. 2.

As can be seen from FIG. 2, the connecting cap 9 includes a seat face 15 for the protective cone 12, a tubular end piece which constitutes the protective tube connector 13 connecting with the protective tube 8, as well as, means for providing a connection with the sliding ring 10. The means includes a locking lug 14 which secures the sliding ring 10 in the axial direction between two stops. Furthermore, the connecting cap 9 holds the sliding ring 1 0 in the radial direction to prevent the connecting cap from expanding. Towards the protective tube 8, the sliding ring 10 includes two formed-on resilient locking elements 22 which substantially project in the direction of the longitudinal axis 7 and which are arranged so as to be offset by 180° around the longitudinal axis.

At its free end, each resilient locking element 22 includes a lug 30. The lug 30 projects radially outwardly from the longitudinal axis 7. The lug 30, towards the associated universal joint 2, includes a locking face 28. Towards the protective tube 8, the lug 30 includes an inclined slide-on face 31. The face 31 is provided with an indentation 32 to permit engagement of a tool.

The protective cone 12 includes a protective element 17, made of a first material, and a fixing portion 16 made of a higher-grade material. However, provided a suitable material and suitable production materials are available, it is possible for the fixing portion 16 and the protective element 17 to be produced as one component.

The fixing portion 16 includes a bore 18 designed to match the seat face 15 of the protective cap 9. Furthermore, the fixing portion 16 includes two stops 19, 20 between which the protective element 17 is secured. The protective element 17 and the fixing portion 16 substantially form one component which may either be slid onto the connecting cap 9 or removed therefrom.

Stops 21, 26 and two resilient locking elements 22 with locking faced 28 secure the fixing portion 16 and thus the protective cone 12 on the connecting cap 9 in the direction of the longitudinal axis 7. The locking elements 22 come to rest against the respective counter faces 29, 29' of the fixing portion 16. The two stops 21, 26 prevent the protective cone 12 from moving towards the universal joint 2. The locking faces 28, in connection with the counter faces 29 or 29', prevent any movement in the opposite direction along the longitudinal axis 7. The counter face 29 forms part of a radial aperture 23 of the fixing portion for a first locking element 22. The counter face 29' forms part of a cutout 24 for the second locking element 22. The cutout 24 starts from the end face 25 of the fixing portion 16. The cutout 24 is open towards the end face 25. The positions of the aperture 23 and of the cutout 24 are visible most clearly in FIG. 4.

By arranging the lug 30 of a resilient locking element 22 in an aperture 23, it is not possible to actuate the locking element 22 manually. It is necessary to use a tool, for example a screw driver which, by its point, engages the indentation 23 and is loaded in this way.

To provide additional security, it is possible for the locking face 28 and counter face 29, 29' to be slightly inclined. Thus, positive locking conditions occur when load is applied by the fixing portion 16 in the direction of the longitudinal axis 7 towards the connected protective tube 8. The lug 30 of the second locking element, which cooperates with the cutout 24 and is not especially illustrated, can, because of the cutout design, be operated by hand. Thus, the protective cone 12 may be removed from the connecting cap 9 by releasing one locking element 22 by hand while the other locking element can only be released by a tool.

To ensure that, even if fatigue occurs, the resilient locking element does not lose its locking function, it is associated with a supporting leaf spring 27. One end of the leaf spring 27 is supported against the underside of the resilient locking element 22 and the other end against the sliding ring 10.

Figure 3:
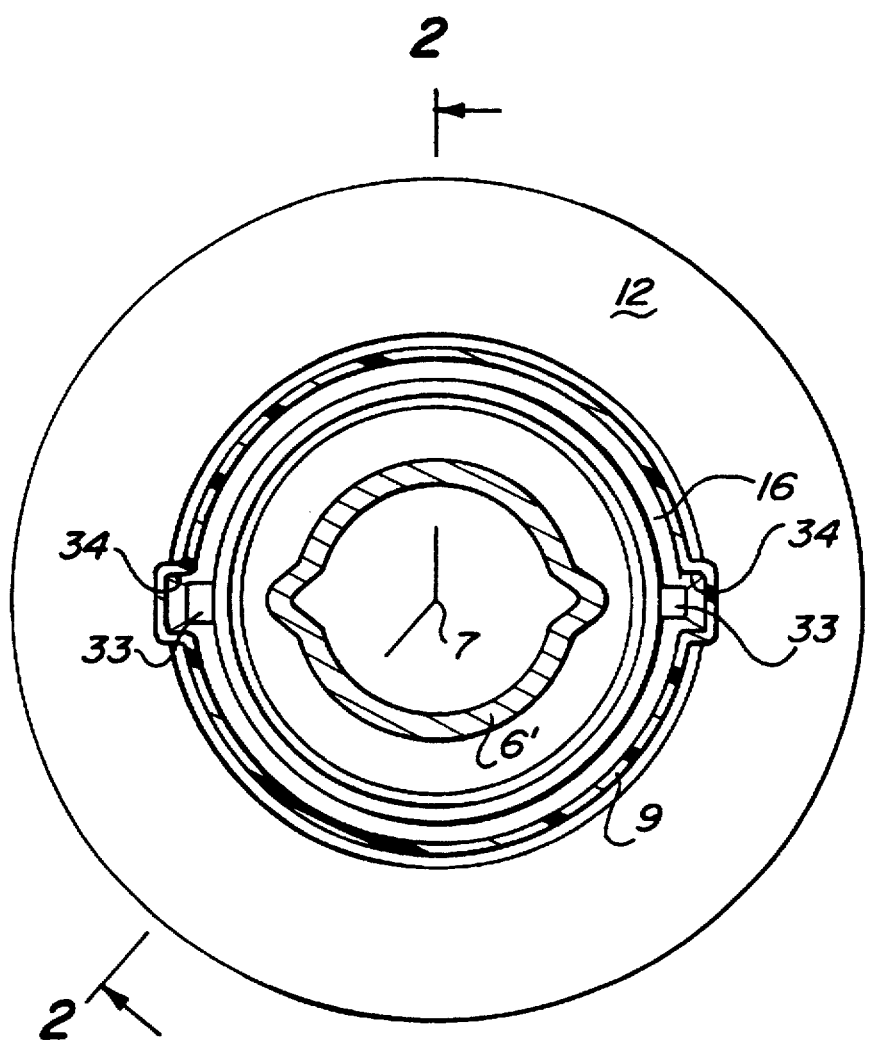
FIG. 3 is a section view along line 3—3 of FIG. 2.

FIG. 3 illustrates the protective cone 1 2 additionally secured in the direction of rotation around the longitudinal axis 7 on the connecting cap 9. For this purpose, again as illustrated in FIG. 3, the connecting cap 9 includes two wedges 33 which are offset by 180°. The wedges 33 include faces which are inclined towards the ends of the wedges. The faces, in the direction of the protective tube 8, enable the fixing portion 16, via its grooves 34, to be easily slid on and centered on the connecting cap 9.

However, in the assembled condition, the wedges 33 and grooves 34 rest against one another with planar faces, thereby securing the parts concerned in the direction of rotation.

Figure 4:
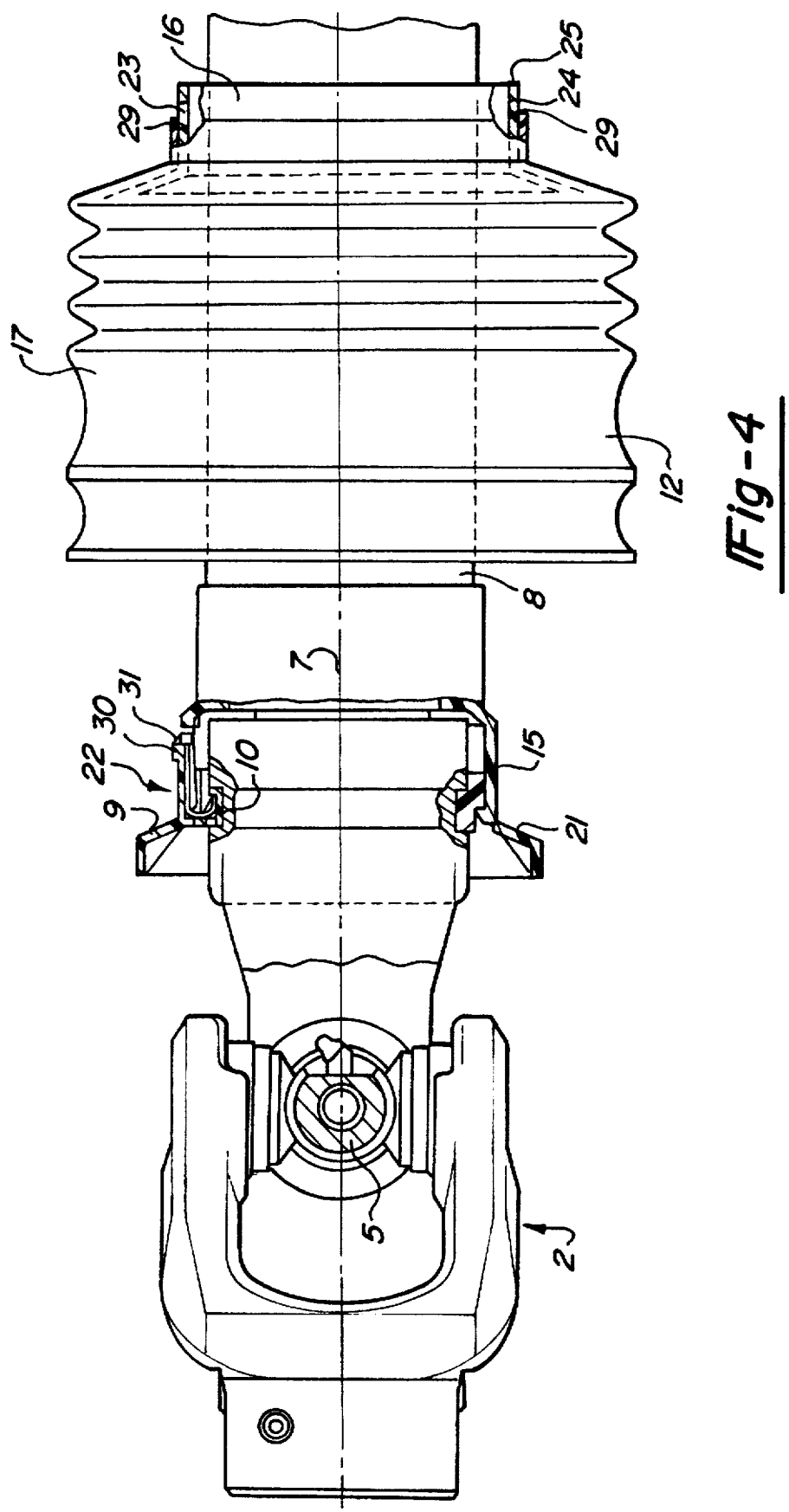
FIG. 4 is a partial section view like FIG. 2 with the protective cone removed from the connecting cap.

FIG. 4 shows the protective cone 12 in its withdrawn position from the connecting cap in the direction of the protective tube 8. Thus, this movement enables access to the universal joint 2 for lubricating the bearing means of the cross member 5, the sliding ring 10, and the sliding parts. When the protective cone 12, starting from the position illustrated in FIG. 4, is again slid on to the connecting cap 9, by means of its fixing portion 16, the connecting cap 9, via its bore, comes into contact with the slide-on faces 31 of the resilient locking elements 22 which enables the locking elements 22 to spring back into a position which is closer with reference to the longitudinal axis 7. This enables the fixing portion 16 to pass the lug 30 until the assembly position has been reached and until the lug 30 is again able to spring radially outwardly to secure the fixing portion 16.

While the above detailed description describes the preferred embodiment of the present invention, the invention is susceptible to modification, variation and alteration without deviating from the scope and fair meaning of the subjoined claims.

We claim:

1. A protective device for a driveshaft including two universal joints, each joint including two joint yokes and a cross member articulatably connecting the yokes, and a connecting shaft with two sliding profiles inserted into one another, one end of each sliding profile is connected to one of the joint yokes of the two universal joints, said device comprising:

two protective tubes inserted into one another and intended to be arranged coaxially relative to the connecting shaft and to the longitudinal axis of the connecting shaft;

each universal joint having a connecting cap, a sliding ring and one protective cone, said connecting cap, sliding ring and protective cone being discrete from one another, said protective cone being intended for at least partially axially covering the associated universal joint, with the one protective cone, the one protective tube and the one sliding ring being connected to the one connecting cap of each universal joint and with the one sliding ring being intended to be supported in a groove of a joint yoke of the associated universal joint, and with the one protective cone being removably attached to the connecting cap even if the protective device is mounted to the driveshaft;

said connecting cap being provided with a seat face for receiving a fixing portion of the protective cone and from the seat face the protective cone is manually removable from said connecting cap, said fixing portion of the protective cone and the connecting cap including means for form-fittingly connecting the fixing portion of the protective cone and the connecting cap in a rotational direction around the longitudinal axis, said means, with reference to the longitudinal axis, enabling the fixing portion of the protective cone to be axially slid on and pulled off of the connecting cap, said seat face of the connecting cap and said fixing portion of the protective cone further including stops for fixing the fixing portion of the protective cone on said seat face, in an axial direction along the longitudinal axis away from the connected protective tube;

at least one resilient locking element integral with said sliding ring, said locking element being transferable into a withdrawn position, when said fixing portion, of the protective cone engaging said seat face of the connecting cap and, after the assembly position of the protective cone and connecting cap relative to one another has been reached, said locking element returning back to secure the fixing portion in an axial direction along the longitudinal axis towards the protective tube by a locking face engaging a respective counter face on the fixing portion.

2. A protective device according to claim 1, wherein the sliding ring is plastic, especially polyamide, and for supporting purposes, a metallic leaf spring is associated with the resilient locking element.

3. A protective device according to claim 1, wherein two resilient locking elements are provided circumferentially offset around the longitudinal axis by 180°.

4. A protective device according to claim 1, wherein the counter face of the fixing portion is arranged in a radial aperture of the fixing portion.

5. A protective device according to claim 1, wherein the counter face of the fixing portion is arranged in a cutout of the fixing portion.

6. A protective device according to claim 1, wherein the locking face forms part of a lug projecting outwardly from the longitudinal axis.

7. A protective device according to claim 6, wherein for the purpose of transferring the locking element into the withdrawn position, the lug is provided with a slide-on face for the fixing portion.

8. A protective device according to claim 6, wherein the lug includes an indentation to allow the engagement of a tool.

9. A protective device according to claim 1, wherein the protective cone including a component constituting the fixing portion and a component constituting a protective element.

10. A protective device according to claim 1, wherein the means for achieving form-fitting connection between the fixing portion of the protecting cone and the connecting cap in a rotation direction around the longitudinal axis including wedges provided at the connecting cap and being circumferentially distributed around the longitudinal axis and projecting radially outwardly beyond the seat face of the connecting cap and correspondingly formed and distributed grooves extending parallel to the longitudinal axis of said fixing portion of the protective cone.

* * * * *